US012689589B2

(12) United States Patent
Malvessi-Pereira et al.

(10) Patent No.: US 12,689,589 B2
(45) Date of Patent: Jul. 21, 2026

(54) GROUP-BASED NETWORK SEGMENTATION USING DYNAMIC GROUPS

(71) Applicant: Arista Networks, Inc., Santa Clara, CA (US)

(72) Inventors: Mateus Malvessi-Pereira, Vancouver (CA); Zhongxiang Ye, Vancouver (CA); Padmini Misra, Fremont, CA (US); Justin Costa-Roberts, San Francisco, CA (US)

(73) Assignee: ARISTA NETWORKS, INC., Santa Clara, CA (US)

( * ) Notice: Subject to any disclaimer, the term of this patent is extended or adjusted under 35 U.S.C. 154(b) by 78 days.

(21) Appl. No.: 18/901,275

(22) Filed: Sep. 30, 2024

(65) Prior Publication Data

US 2026/0095410 A1     Apr. 2, 2026

(51) Int. Cl.
| | |
|---|---|
| *H04L 47/20* | (2022.01) |
| *H04L 9/40* | (2022.01) |
| *H04L 41/0893* | (2022.01) |

(52) U.S. Cl.
CPC .......... *H04L 47/20* (2013.01); *H04L 41/0893* (2013.01); *H04L 63/105* (2013.01); *H04L 63/20* (2013.01)

(58) Field of Classification Search
None
See application file for complete search history.

(56) References Cited

U.S. PATENT DOCUMENTS

| | | | | |
|---|---|---|---|---|
| 10,785,115 | B2 * | 9/2020 | Mishra | .................. H04L 41/046 |
| 2016/0080250 | A1 * | 3/2016 | Ramachandran | ....... H04L 47/32 |
| | | | | 709/226 |
| 2017/0063822 | A1 * | 3/2017 | Jain | ..................... H04L 12/4641 |
| 2017/0237745 | A1 * | 8/2017 | Desai | .................... H04L 63/104 |
| | | | | 726/1 |
| 2019/0089773 | A1 * | 3/2019 | Dias | ....................... G06F 9/5088 |
| 2019/0222610 | A1 * | 7/2019 | Kirner | ..................... H04L 41/22 |
| 2020/0177503 | A1 * | 6/2020 | Hooda | ................ H04L 12/4641 |
| 2020/0220845 | A1 * | 7/2020 | Cook | ................ H04L 63/0263 |
| 2021/0067538 | A1 * | 3/2021 | Mishra | ................ H04L 63/1433 |
| 2021/0144159 | A1 * | 5/2021 | Sanghvi | ............. H04L 63/1425 |
| 2021/0144181 | A1 * | 5/2021 | Mishra | ................ H04L 63/1491 |

(Continued)

*Primary Examiner* — Phyllis A Book
(74) *Attorney, Agent, or Firm* — Fountainhead Law Group, PC

(57) ABSTRACT

A network is partitioned into multiple domains and managed by a network controller. The network controller stores segmentation policies defined in terms of user groups, wherein members in a user group are identified by IP addresses or IP prefixes. An administrator controls which user groups communicate with each other and in which domains by associating segmentation policies with domains. Classification sources external to the network controller inform the network controller of changes to the membership of the user groups. The network controller uses the group membership information and segmentation policy/domain assignments to generate traffic policies. Each traffic policy is specific to a domain; the traffic policy is generated only from the segmentation policies of the domain, and consists of segmentation policy rules associated with the domain and members in the group's associated with those policy rules.

20 Claims, 8 Drawing Sheets

(56) References Cited

U.S. PATENT DOCUMENTS

| | | | |
|---|---|---|---|
| 2021/0226865 A1* | 7/2021 | Gupta | H04L 43/026 |
| 2021/0234900 A1* | 7/2021 | Francis | H04M 15/66 |
| 2021/0243158 A1* | 8/2021 | Fandli | H04L 63/0236 |
| 2023/0362066 A1* | 11/2023 | Sanghvi | H04L 41/5019 |
| 2025/0150348 A1* | 5/2025 | Hooda | H04L 41/0894 |
| 2025/0168170 A1* | 5/2025 | Hassler | H04L 63/101 |
| 2025/0211596 A1* | 6/2025 | Kanekar | H04L 63/08 |

* cited by examiner domain ID, 504       network devices, 506

| domain 1 | device 1.a | device 1.b | • • • | device 1.n |
| domain 2 | device 2.a | device 2.b | • • • | | entry, 502

502 domains data store, 204 policy ID, 404       domain ID, 504

| segmentation policy 1 | Domain 1 (VRF1) |
| segmentation policy 2 | Domain 1 (VRF2) |
| segmentation policy 3 | Domain 2 | entries, 602 policy / domain assignments data store, 206

GROUP-BASED NETWORK SEGMENTATION USING DYNAMIC GROUPS

CROSS REFERENCE TO RELATED APPLICATIONS

This application is related to U.S. Pat. No. 11,695,627, filed Jan. 5, 2022 and issued Jul. 4, 2023, and U.S. application Ser. No. 18/324,077, filed May 25, 2023, the content of both of which is incorporated herein by reference in their entirety for all purposes.

BACKGROUND

Security solutions implemented by many organizations focus on protecting the perimeter of the network with firewalls. However, if an attacker is able to gain access to the internal network, there is no protection anywhere in the network. Preventing lateral movement within the network is important to provide the next level of security such that an attacker that gains entry into the network is limited to some parts of the network and does not get full access to all of the internal network.

BRIEF DESCRIPTION OF THE DRAWINGS

With respect to the discussion to follow and in particular to the drawings, it is stressed that the particulars shown represent examples for purposes of illustrative discussion, and are presented in the cause of providing a description of principles and conceptual aspects of the present disclosure. In this regard, no attempt is made to show implementation details beyond what is needed for a fundamental understanding of the present disclosure. The discussion to follow, in conjunction with the drawings, makes apparent to those of skill in the art how embodiments in accordance with the present disclosure may be practiced. Similar or same reference numbers may be used to identify or otherwise refer to similar or same elements in the various drawings and supporting descriptions. In the accompanying drawings.

DETAILED DESCRIPTION

Figure 1A:
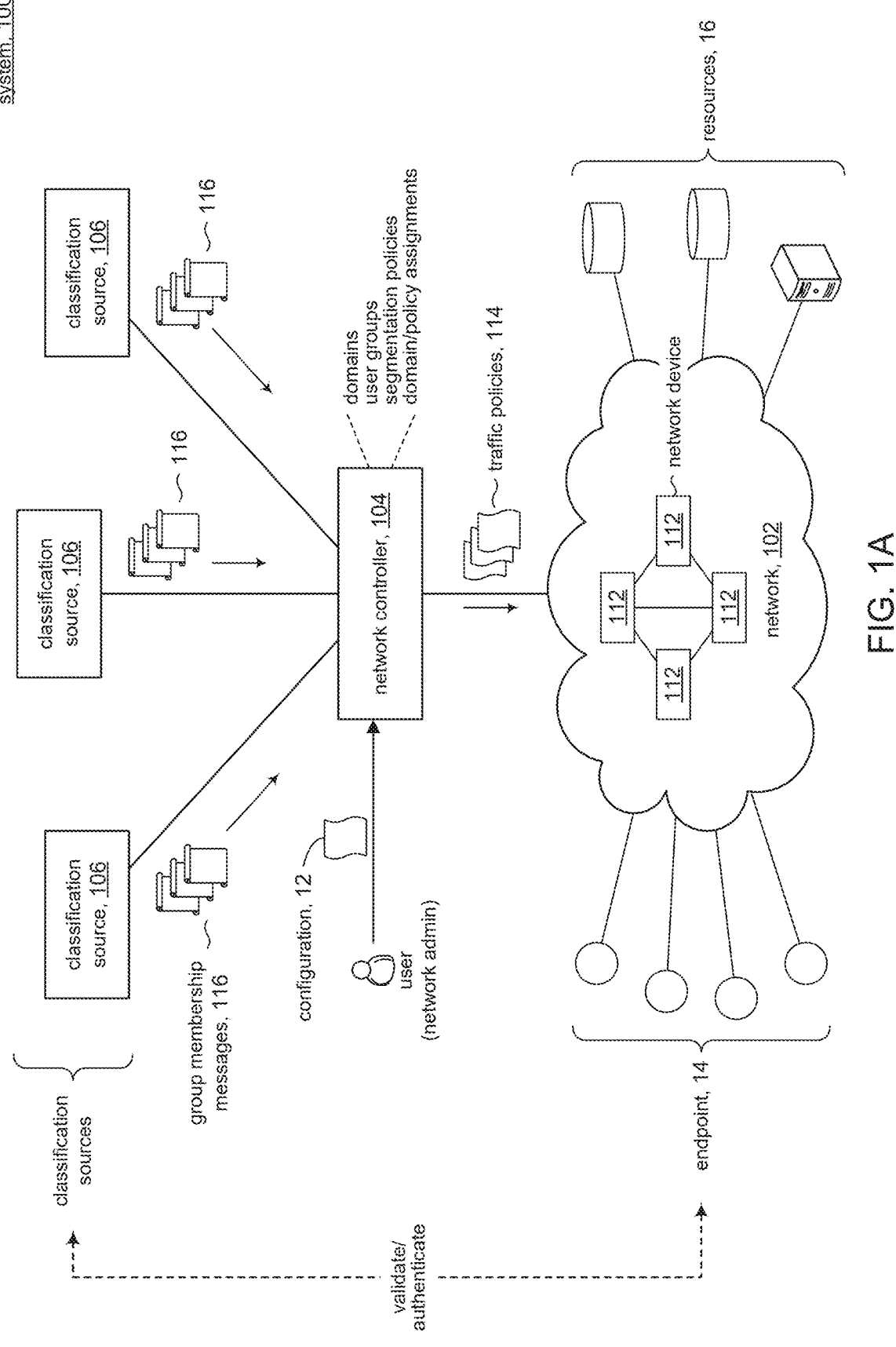
FIGS. 1A and 1B are high-level representations of a deployment in accordance with the present disclosure.

In accordance with the present disclosure, a network deployment can be partitioned into network domains and communication among groups of users can be managed to increase security in the network. The present disclosure provides for automated configuration and maintenance of segmentation policies to manage communication between dynamically changing user groups.

The present disclosure includes a centralized network controller that manages the network deployment. An example of a production network controller is the CloudVision® network management platform ("CloudVision") developed and sold/licensed by Arista Networks, Inc. of Santa Clara, California; although it will be understood that embodiments in accordance with the present disclosure can be used in other controller architectures. A network administrator using CloudVision can define domains in their deployment and apply policies to those domains that are expressed in terms of user groups. The network administrator can assign policies to the domains to provide secured communication (forward, deny, log, etc.) between user groups and domains. For discussion purposes, policies defined in CloudVision will be referred to as "segmentation policies" to distinguish from their corresponding "traffic policies," the latter being streamed to network devices in the deployment to program hardware forwarding tables in the network devices.

The Multi-Domain Segmentation Service® platform ("MSS") is a solution developed and sold/licensed by Arista Networks, Inc. of Santa Clara, California. MSS allows the user (network administrator) to segment the network into domains, and define group-based policies to restrict traffic flow in the network. An attacker who is able to gain access to the network can nonetheless be restricted in their movement.

Domains

Domains are separate segments of the network that are defined by the network administrator. Traffic within a domain and between domains can be managed (forward, deny, log, etc.) according to segmentation policies applied to that domain.

User Groups

Users in the deployment can be managed by way of user groups ("groups"). In accordance with some embodiments of the present disclosure, CloudVision can communicate with various external classification sources that classify users who access resources on the network into different groups. For example, the external classification source can send group membership messages to CloudVision comprising information that identifies groups and members in those groups on a repeated basis as the membership changes. Members, for example, can be identified using their IP addresses or an IP prefix. The groups are dynamic in that the group membership can change over time as subsequent group membership messages are received from the external classification sources.

In accordance with the present disclosure, CloudVision can maintain a group membership table of groups and members within the group. CloudVision can update the group membership table each time CloudVision receives a message from the external classification source. Examples of classification sources include services such as the AGNI® network identity service, the VCenter® resource management service, and the like.

Segmentation Policies

In accordance with the present disclosure, CloudVision allows a network administrator (customer) to define or otherwise configure segmentation policies in terms of user groups. A segmentation policy comprises rules that manage communications between user groups:

segmentation policy rule: [match criteria], [action set], where "match criteria" is used to identify traffic (packets) expressed in terms of user groups and can include other data fields such as protocol, port, and the like; and "action set" determines how the traffic is processed; e.g., forward, drop, mirror, etc.

The network administrator can apply the segmentation policies to various domains in the deployment, thus allowing control over which user groups can communicate with each other and in which domains.

Traffic Policies

CloudVision can stream traffic policies corresponding to the segmentation policies to the network devices in the deployment. Processing in CloudVision includes:

For a given segmentation policy, generate a corresponding traffic policy. The traffic policy is a data object comprising the segmentation policy and group membership information only for user groups identified in the policy rules of the segmentation policy. Membership in the user groups can change over time as group membership messages come in. By expressing the segmentation policy rules in terms of user groups rather than individual users (i.e., their network addresses) in those groups, users can be added and removed from a group without having to constantly update the policy rules. It is only when the traffic policy is generated and streamed to the network devices that the group membership information is included. This way the network device receives the most up to date group membership.

Stream the traffic policy only to network devices in the domains associated with the given segmentation policy.

Repeat for other segmentation policies.

The present disclosure ensures that only traffic policies corresponding to the segmentation policies associated with a given domain will be streamed to network devices in that domain, thus avoiding sending traffic policies to network devices that are not in the given domain. The traffic policy for a given segmentation policy will comprise the current members only for those members in the user groups referenced in the segmentation policy.

In the following description, for purposes of explanation, numerous examples and specific details are set forth in order to provide a thorough understanding of embodiments of the present disclosure. Particular embodiments as expressed in the claims may include some or all of the features in these examples, alone or in combination with other features described below, and may further include modifications and equivalents of the features and concepts described herein.

Figure 1B:
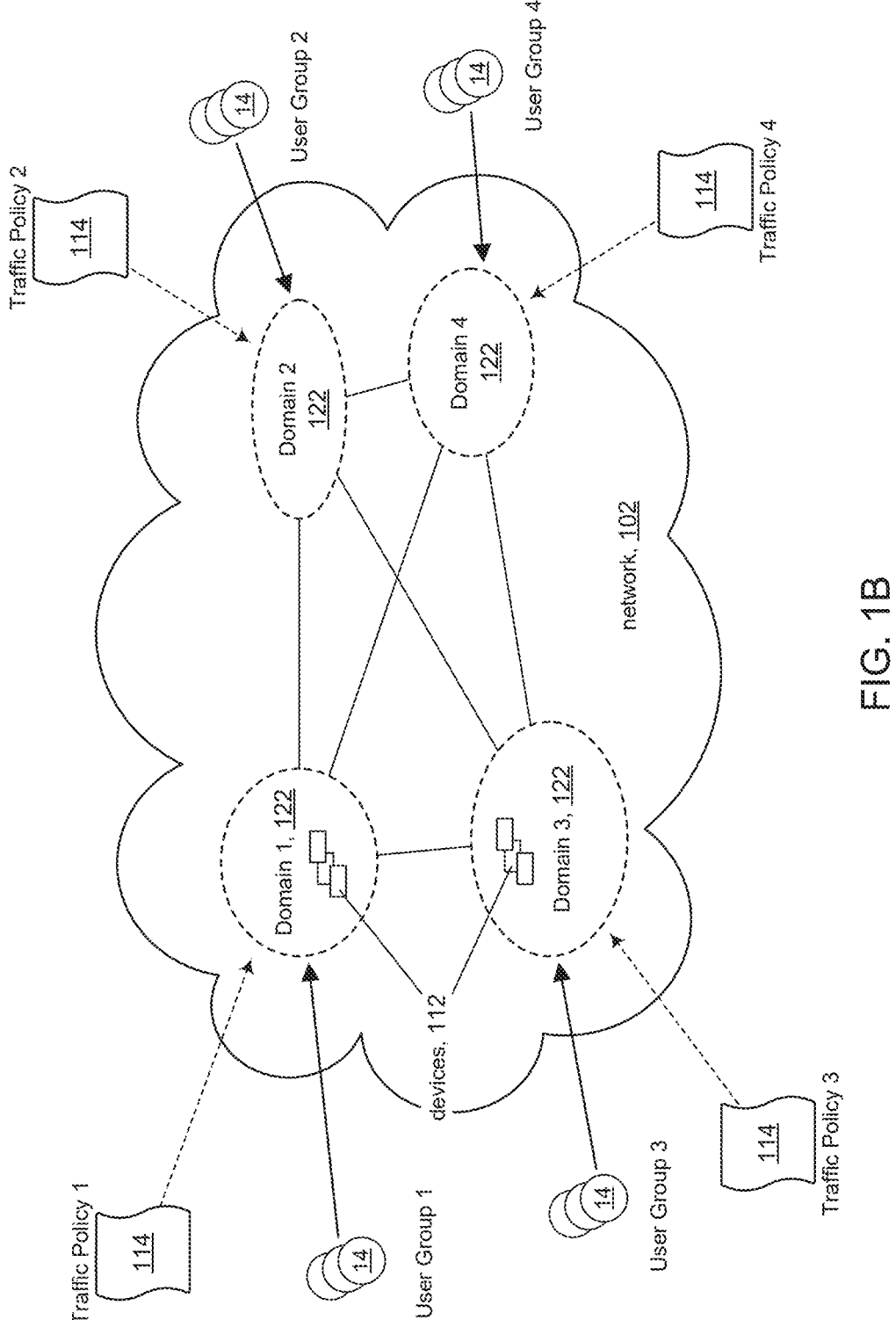

FIG. 1A is a high-level representation of a networked system 100 that can embody techniques in accordance with the present disclosure. System 100 can include a network 102 comprising network devices 112. The network 102 can be partitioned in that the network devices 112 can be grouped or segmented into different domains. Referring for a moment to FIG. 1B, as an example, network 102 can be segmented into domains 122. Each domain 122 can comprise a subset of the network devices 112 that constitute network 102. In some embodiments, each domain 122 comprises a non-overlapping subset of network devices.

Continuing with FIG. 1A, system 100 includes network controller 104 which can manage the network devices 112. An example of a network controller for discussion purposes is the CloudVision® network management platform (CloudVision) developed and sold/licensed by Arista Networks, Inc. of Santa Clara, California; although it will be understood that embodiments in accordance with the present disclosure can be used in other controller platforms.

Network controller 104 can communicate with classification sources 106. Classification sources can be used in a zero trust network where all users who want to access the network must be validated before they can gain access to resources 16 in the network. In a zero trust environment, all users are treated equally including users inside of the network (e.g., employees, network enabled sensors, device, etc.) as well as users outside of the network (e.g., guests, contractors, etc.). Examples of classification sources 106 include the AGNI® network identity service developed and sold/licensed by Arista Networks, Inc. of Santa Clara, California, the VCenter® resource management service sold/licensed by Broadcom, Inc., and the like.

Classification sources can provide services to monitor and validate/authenticate users, devices, applications, and the like (collectively, endpoints 14) that access resources 16 (e.g., databases, servers, etc.) on network 102. A given endpoint 14 may be validated by different classification sources 106 at different times, depending on how that endpoint accesses the network 102. Classification sources 106 can group endpoints 14 into different user groups, and communicate these user groups to network controller 104 via group membership messages 116. These aspects of the present disclosure are discussed further in the disclosure below.

Network controller 104 can receive configuration information 12 from a user (e.g., network administrator) to configure network 102 via suitable user interfaces; e.g., command line interface, Web access, etc. The user can define/configure domains within network 102. The user can define/configure segmentation policies that specify which user groups can communicate with other user groups, and associate those policies to the domains. In this way the user can restrict which user groups can communicate with other user groups and in which domains.

In accordance with the present disclosure, network controller 104 can generate traffic policies 114 based on configurations 12 from the user. The traffic policies 114 can then be streamed to the network devices 112. In accordance with the present disclosure, network controller 104 can customize traffic policies 114 so that policies streamed to network devices in a given domain comprise rules specific to traffic flow between user groups targeted by the policies. FIG. 1B illustrates this aspect of the present disclosure, where each domain 122 is programmed with a traffic policy 114 that is specific to that domain. For example, Traffic policy 1 is specific to Domain 1, Traffic policy 2 is different from Traffic policy 1 and specific to Domain 2, and so on. These aspects of the present disclosure are described in more detail below.

Figure 2:
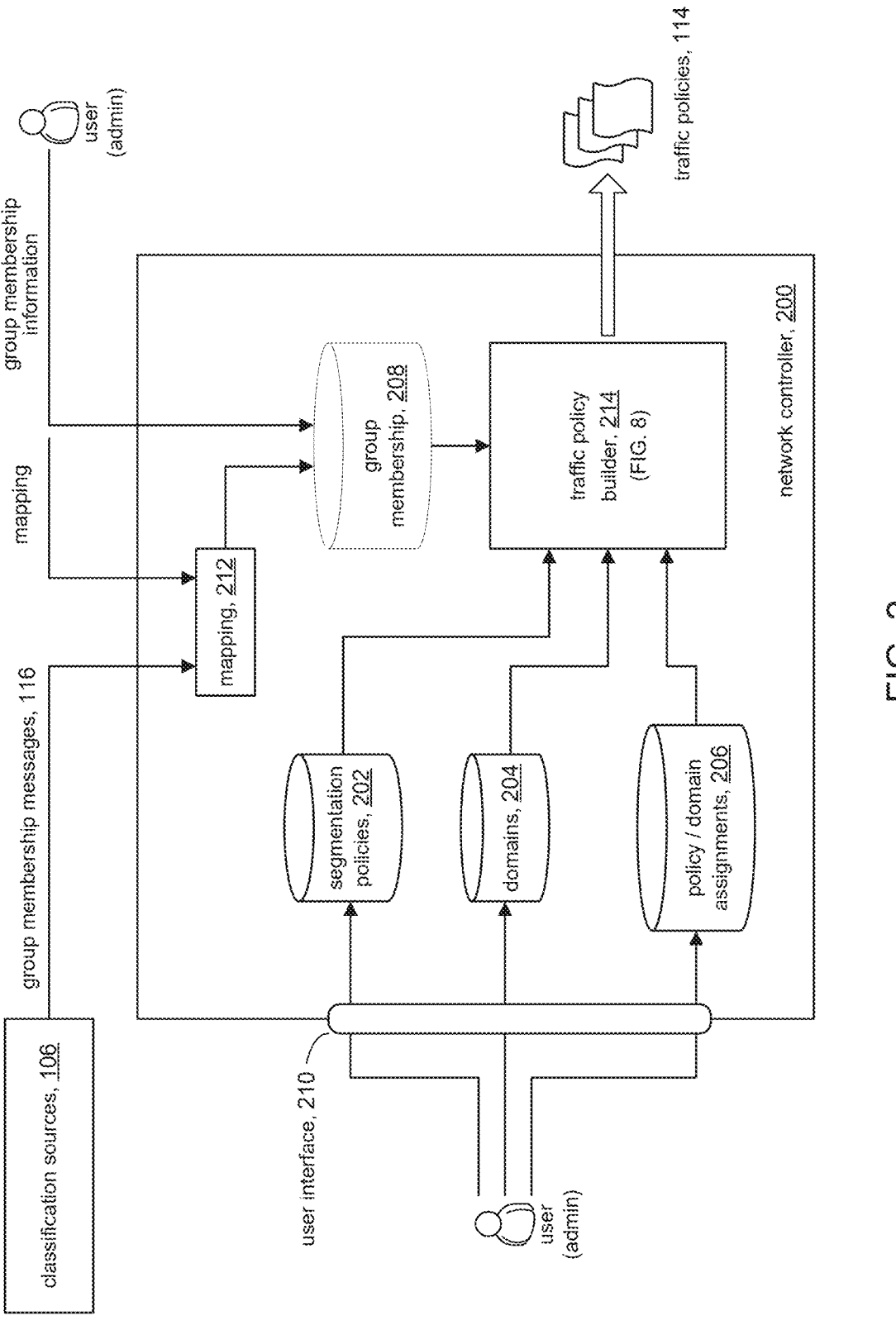
FIG. 2 shows details of a network controller in accordance with the present disclosure.

FIG. 2 is a high-level representation of a network controller 200 in accordance with some embodiments. Network controller 200 can include various data stores to store user-specified configuration information. In some embodiments, for example, a segmentation policy data store 202 can store segmentation policies defined by the user. A domains definition data store 204 can store domains defined by the user. A policy/domain assignment data store 206 can store policy to domain assignments made by the user. Network controller 200 can provide a suitable interface 210 for the user to configure, view, and modify the information contained in the data stores 202, 204, 206.

A group membership data store 208 can store the group membership for each user group. As explained above, group membership information can be provided by the classification sources 106 via group membership messages 116. In some embodiments, group membership information can be provided by the user, in addition to the classification sources 106.

A traffic policy builder 214 can generate traffic policies 114 in accordance with the present disclosure using information stored in data stores 202, 204, 206, 208. This aspect of the present disclosure is discussed below in connection with FIGS. 8, 9, and 10.

Group Membership Data Store, 208

The group membership data store 208 can store the group membership for user groups defined by the user or by the classification sources 106. The membership of a user group comprises endpoints 14. Endpoints refer to devices that access resources 16 on the network. Endpoints can be users (e.g., their desktop computers, laptop computers, mobile devices, etc.), devices (e.g., Internet-of-things (IOTs) such as cameras, embedded sensors, etc.), applications, etc. Individual endpoints can be identified by their Internet protocol (IP) addresses or other suitable network address information. In some instances, groups of endpoints can be identified by an IP prefix. For example, the network administrator may want all camera devices to be placed in the subnet 192.0.10.0/24 on admission to the network, the network administrator may assign all guests to a subnet, and so on. As used herein, the expression "IP address" will be understood to refer to either an IP address or an IP prefix. It will also be understood that the present disclosure includes IPv4 and IPv6 addressing formats.

Figures 3, 4:
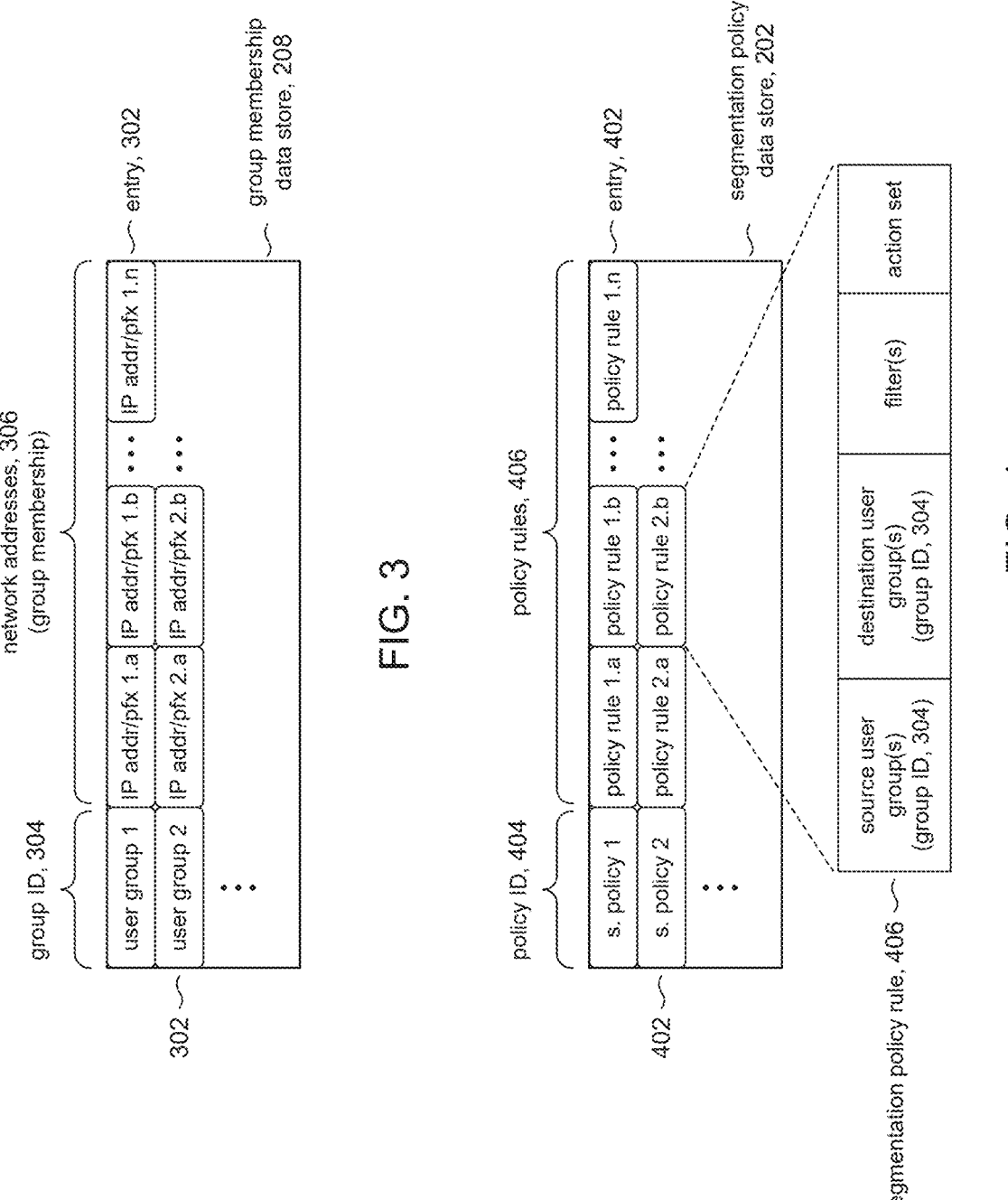
FIG. 3 is an illustrative representation of a group membership table.
FIG. 4 is an illustrative representation of a segmentation policy table.

Referring for a moment to FIG. 3, in some embodiments group membership data store 208 can comprise a suitable data object such as a table of entries 302, where each entry corresponds to a user group. Each entry 302 can include a local group identifier 304 that identifies the user group and group membership 306 comprising one or more network addresses of endpoints (members) in the user group.

Group Membership Message, 116

Continuing with FIG. 2, user groups defined by classification sources 106 can be communicated to the network controller 200 via group membership messages 116 to communicate membership updates to the network controller. The membership update information in a group membership message 116 can be generically represented as follows:

classification sources 106 send group membership messages 116 to the network controller 104 absent any interaction from the user (network administrator). As will be explained below, in some embodiments the network controller 104 can push changes in membership to the appropriate domain(s) as they come in. By comparison, a static user group is a user group that is defined by the user, and whose membership is managed (add/remove) by the user.

Mapping Information, 212

Classification sources 106 generally are independent of each other. As such, different classification sources 106 may use different group tags to identify the same endpoints or the same kind of endpoints (e.g., all camera devices). For example, one classification source may tag camera device endpoints with a group tag of "Group_1", and another classification source may tag camera device endpoints with a group tag of "DeviceGroup". In some embodiments, the network controller 200 can include user-defined mapping information 212 to map different group tags from different classification sources 106 that belong to the same class of endpoints (e.g., camera devices, guest, etc.) to a common local group name in the group membership data store 208. In the camera device example, for instance, mapping information 212 can include an entry that maps the tag name Group_1 to the local group name "CameraDevices," and another entry that likewise maps the group tag DeviceGroup to the group name CameraDevices. In this way, the group membership information, namely the IP addresses, from both classification sources can be stored in the same entry in the group membership data store 208.

Segmentation Policies Data Store, 202

A segmentation policy comprises a set of user-defined segmentation policy rules to manage communications between user groups in the network. Referring for a moment to FIG. 4 for example, in some embodiments segmentation policy data store 202 can comprise a suitable data object such as a table of entries 402, where each entry corresponds

```
                  <group tag > : ADD / REMOVE: { IP address/prefix, IP address/prefix 2, ... }
    where     "group tag" is information that identifies a user group,
              the ADD / REMOVE label indicates to add or remove network addresses from the group to
              update the membership of the group
              "IP address/prefix" is the network address of an endpoint in the group. The set of IP
              addresses and/or IP prefixes can be referred to as the membership of the user group.
```

It will be appreciated that the specific format of a group membership message can vary from one classification source to another.

When a group membership message 116 is received, the network controller 200 can update the group membership data store 208. For example, if the received group membership message is an ADD message that includes an IP address that is not already in the group membership table, then the IP address can be added. Conversely, if the group membership message is a REMOVE message, then the IP address(es) in the specified user group can be deleted from the group membership table.

The membership of a user group can be "dynamic" in that its membership can change (added to, removed from) as to a segmentation policy. Each entry 402 can include an identifier 404 that identifies the segmentation policy and one or more segmentation policy rules 406 that constitute the segmentation policy.

In accordance with the present disclosure, a policy rule 406 can be expressed in terms of user groups rather than the individual members (i.e., network addresses) in the user group. Referring to the user group instead of its members allows the membership to change (added or removed from the group) over time without having to redefine the policy rule 406. In some embodiments, the user groups can be identified by the local group identifiers 304 in the group membership data store 208 shown in FIG. 3.

Each policy rule 406 in a segmentation policy can specify:

```
                  <source group(s); destination group(s)>
                  <filter(s)>
                  <action set>
    where     <source group(s), destination group(s)> can be one or more user groups as the source(s)
              of traffic and one or more user groups as the destination(s) of the traffic. The specified
```

-continued

--- user groups are logically AND'd in the rule for matching traffic.
<filters> can be criteria that match on any aspect of the traffic; e.g., data fields in the
packet headers of the packets in the traffic (e.g., protocol, port, etc.), bit fields in the
payload, etc.
<action set> can be one or more actions to take in connection with the matched packets,
including but not limited to forwarding the traffic, dropping the traffic, redirecting the
traffic, logging, etc.

---

For example, a segmentation policy rule can be created to manage traffic from group A (i.e., members in user group A), as a source, to groups B and C as destinations. Filters might include filtering TCP type traffic (e.g., protocol==TCP) that is destined for port 443 (e.g., port==443) on endpoints in group B and group C, where the action on the filtered traffic is to forward such traffic. The rule can be represented as follows:

---

| <src: group A> <dest: group B, group C> | // source and destination groups |
| <protocol = TCP, destination port = 443> | //filters |
| <forward> | // action set |

---

Figure 5:
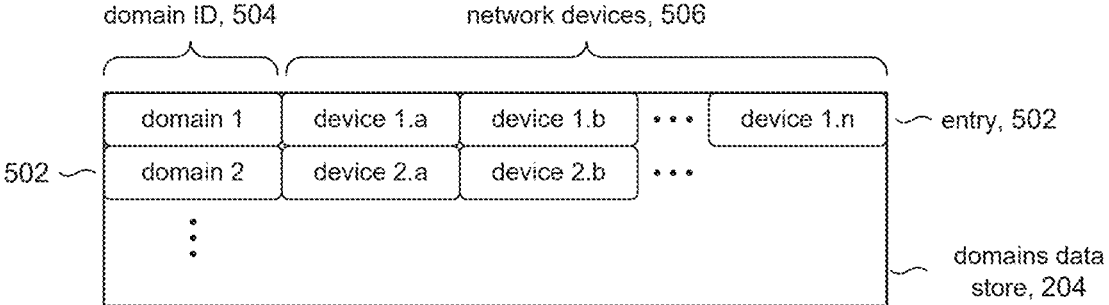
FIG. 5 is an illustrative representation of a domains table.
Figure 6:
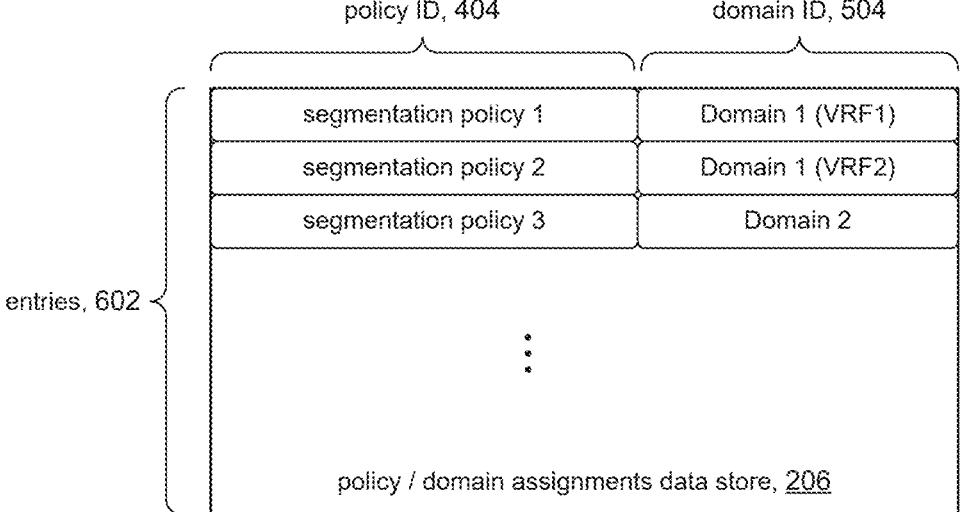
FIG. 6 is an illustrative representation of a policy/domain assignments table.
Figure 7:
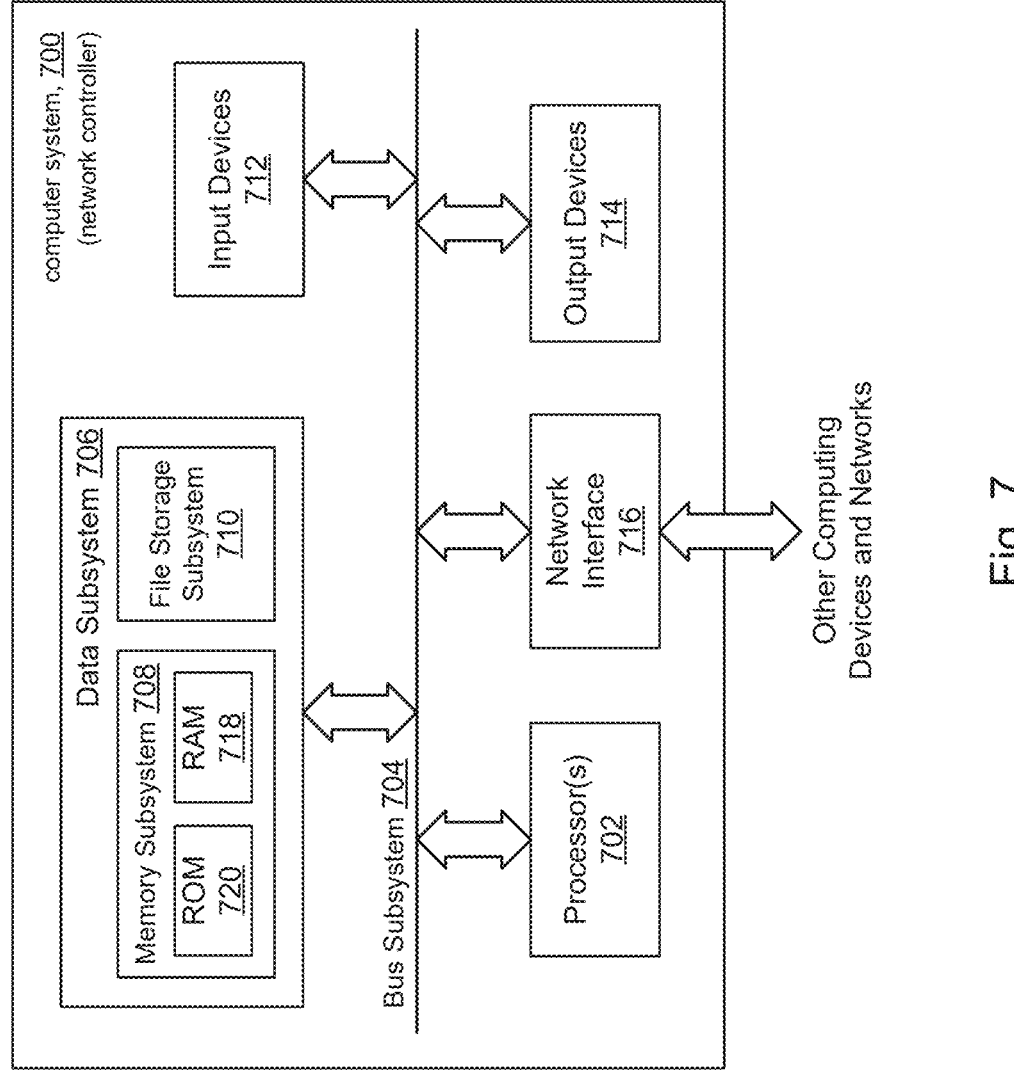
FIG. 7 is a high-level block diagram representation of a computer system that can be adapted in accordance with the present disclosure.

This Rule Will Match on Traffic that:
  originates from any member in "group A" AND
  is destined for port 443 on any endpoint member in both
    "group B" and "group C" AND
  is a TCP protocol.
Matched traffic will be forwarded; i.e., allowed.
Domains Data Store, 204
  Domains are segments of a network, such as illustrated by network 102 in FIGS. 1A and 1B. Each domain comprises a subset of network devices 112 in the network. Domains can be defined by the user; e.g., network administrator. The user can add/delete network devices to/from a domain, move or reassign network devices to between domains, and so on. Referring for a moment to FIG. 5, for example, in some embodiments the domains data store 204 can comprise a suitable data object such as a table of entries 502, where each entry in the table represents a domain. Each entry 502 can comprise an identifier 504 that identifies the domain and a list 506 of network devices 112 in network 102 that constitute the domain.
Policy/Domain Assignments, 206
  The user (e.g., network administrator) can assign segmentation policies to domains, allowing the user to manage communication between user groups in a given domain. Referring for a moment to FIG. 6 for example, in some embodiments the policy domain/assignments data store 206 can comprise a suitable data object such as a table of entries 602, where each entry in the table represents an assignment between (1) a segmentation policy identified by the policy identifier 404 in the segmentation policy data store 202 shown in FIGS. 4 and (2) a domain identified by the domain identifier 504 in the domains data store 204 shown in FIG. 5.
  In some embodiments, the network devices in a domain may operate with multiple virtual routing and forwarding instances (VRFs), where each VRF can take its own segmentation policy. If multiple segmentation policies are associated with corresponding VRFs in a domain, the multiple assignments can be represented by corresponding multiple entries 602 in the policy domain/assignments data store 206. The illustrative example in FIG. 6, for instance, indicates that network devices in "Domain 1" operate with two VRFs:

VRF1, VRF2. As such, policy domain/assignments data store 206 for Domain 1 is associated with two segmentation policies, one policy for VRF1 and another policy for VRF2.
Computer System
  FIG. 7 is a block diagram representation of a computing system adapted in accordance with the present disclosure. FIG. 7 depicts a simplified block diagram of an example computer system 700 according to certain embodiments. Computer system 700 can be used to implement network controller 200 as described in the present disclosure. In some embodiments, computer system 700 includes one or more processors 702 that communicate with a number of components via bus subsystem 704. These components include data subsystem 706 (comprising memory subsystem 708 and file storage subsystem 710), user interface input devices 712, user interface output devices 714, and network interface subsystem 716.
  Bus subsystem 704 can provide a mechanism that enables the various components of computer system 700 to communicate with each other as intended. Although bus subsystem 704 is shown schematically as a single bus, alternative embodiments of the bus subsystem can utilize multiple busses.
  Network interface subsystem 716 can serve as an interface for communicating data between computer system 700 and other devices; e.g., network devices, client computing devices for remote access to the computer system, etc. Embodiments of network interface subsystem 716 can include, e.g., an Ethernet card, a Wi-Fi and/or cellular adapter, and/or the like. Local access to computer system 700 can be provided via input devices 712 (e.g., keyboard, pointing devices, etc.) and output devices 714 (e.g., a computer monitor, etc.).
  Data subsystem 706, comprising memory subsystem 708 and file/disk storage subsystem 710, represents non-transitory computer-readable storage media that can store program code and/or data, which when executed by processor 702, can cause processor 702 to perform operations in accordance with embodiments of the present disclosure.
  Memory subsystem 708 includes memory circuits such as main random access memory (RAM) 718 for storage of instructions and data during program execution and read-only memory (ROM) 720 in which fixed instructions are stored. File storage subsystem 710 can provide persistent (i.e., non-volatile) storage for program and data files, and can include a magnetic or solid-state hard disk drive, an optical drive along with associated removable media (e.g., CD-ROM, DVD, Blu-Ray, etc.), a removable flash memory-based drive or card, and/or other types of storage media known in the art.
  It should be appreciated that computer system 700 is illustrative and many other configurations having more or fewer components than system 700 are possible.
Processing in the Network Controller
  Referring to FIG. 8, the discussion will now turn to a high-level description of processing performed by traffic policy builder 214 (FIG. 2) in network controller 200 for generating traffic policies 114 in accordance with the present disclosure. In some embodiments, for example, the traffic policy builder 214 can include computer executable program code (e.g., stored on a non-transitory computer-readable storage memory device), which when executed by a processor (e.g., 702, FIG. 7) in the network controller, can cause the network controller to perform the processing in accordance with FIG. 8. The operation and processing blocks described below are not necessarily executed in the order shown. Operations can be combined or broken out into smaller operations in various embodiments. Operations can be allocated for execution among one or more concurrently executing processes and/or threads.

In some embodiments, the flow can be triggered by a user, for example, to force an update on network devices in a domain. In other embodiments, the flow can be triggered on a repeated basis in response to receiving group membership messages 116 from classification sources 106. When the flow is triggered, a traffic policy specific to the network devices in a target domain is generated and then distributed to those network devices. The traffic policy is generated from the segmentation policy(ies) associated with the target domain. The flow can be repeated for each domain in the network.

At operation 802, the network controller can set a processing parameter called the "current domain" to point (or refer) to the domain to be processed. Initially, the parameter can be set to the first domain; e.g., the first entry in the domains data store 204 in FIG. 5.

At operation 804, the network controller can compute a traffic policy that is specific to the current domain. In other words, the computed traffic policy can be computed from the segmentation policies assigned to the current domain, details of which are described in connection with FIG. 9.

At operation 806, the network controller can stream or otherwise distribute the computed traffic policy to the network devices of the current domain. The network devices in the current domain can be identified from the domains data store 204 shown in FIG. 5. In some embodiments, for example, the computed traffic policy can be distributed in accordance with the techniques disclosed in commonly owned U.S. Pat. No. 11,695,627 and U.S. application Ser. No. 18/324,077, the content of both of which is incorporated herein by reference in their entirety for all purposes. A network device that receives the computed traffic policy can program its hardware forwarding tables in accordance with the received traffic policy.

At decision point 808, if there is another domain to process, then the network controller can update the current domain to point (or refer) to the next domain to be processed; e.g., the current domain can be set to the next entry in the domains data store 204. Processing can loop back to operation 802, otherwise processing can be deemed to be complete.

As noted above the user can reconfigure domains by adding, deleting, or removing network devices. In accordance with the president's disclosure, the network controller 200 can update traffic policies in those network devices. For example, if the user moves a network device to a new domain, the network controller can automatically remove the old traffic policy from the network device and stream a new traffic policy, generated from segmentation policies associated with the new domain, to the network device.

Figure 9:
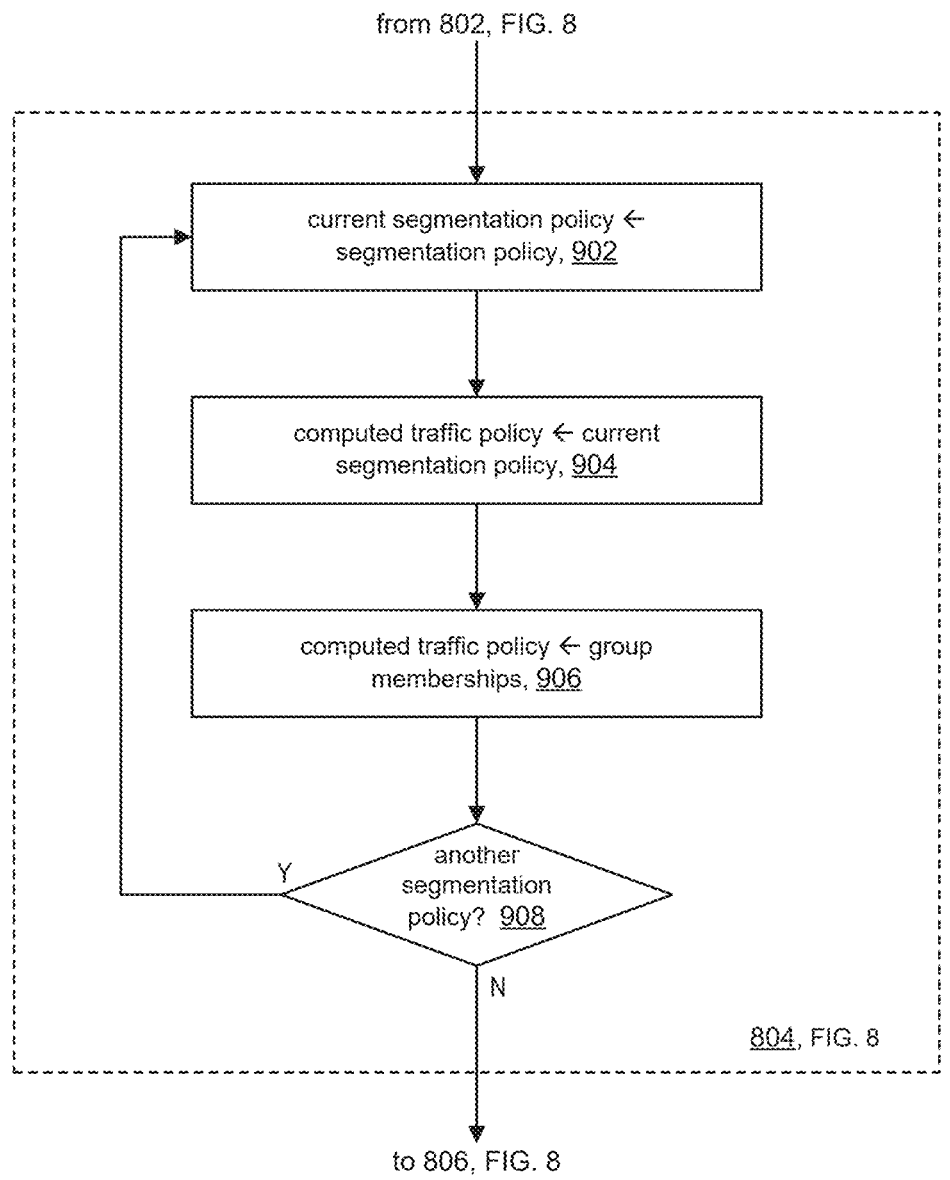

Referring to FIG. 9, the discussion will continue with a high-level description of processing performed by traffic policy builder 214 (FIG. 2) in network controller 200 for computing a traffic policy 114 in accordance with the present disclosure. In some embodiments, for example, the traffic policy builder 214 can further include computer executable program code (e.g., stored on a non-transitory computer-readable storage memory device), which when executed by a processor (e.g., 702, FIG. 7) in the network controller, can cause the network controller to perform the processing in accordance with FIG. 9. The operation and processing blocks described below are not necessarily executed in the order shown. Operations can be combined or broken out into smaller operations in various embodiments. Operations can be allocated for execution among one or more concurrently executing processes and/or threads.

Figure 8:
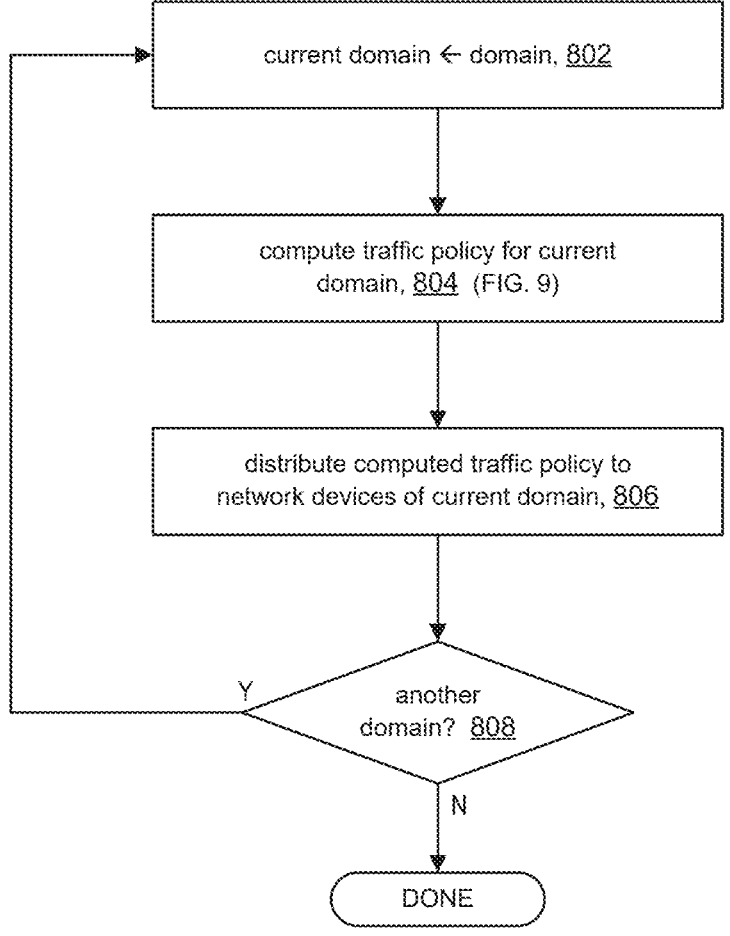
FIGS. 8 and 9 are flows of operations in accordance with the present disclosure.

The processing in FIG. 9 is initiated from operation 802 in FIG. 8 to compute the traffic policy for the current domain. The traffic policy can be any suitable data object that holds the segmentation policy(ies) associated with the current domain and the user groups referenced in those segmentation policies. In some embodiments, the flow generally includes incrementally computing or otherwise building up the traffic policy using the segmentation policy data store 202 in FIG. 4 and the group membership data store 208 in FIG. 3.

At operation 902, the network controller can set a processing parameter called the "current segmentation policy" to point to the segmentation policy to be processed. Initially, the parameter can be set to the first segmentation policy in the current domain. In some embodiments, for example, the network controller can scan the policy/domain assignments data store 206 in FIG. 6 to find the first segmentation policy for the current domain.

At operation 904, the network controller can append the current segmentation policy to the traffic policy being computed to incrementally build up the traffic policy. Referring to FIG. 4, for example, the current segmentation policy can be obtained from segmentation policy data store 202 to obtain a list of its policy rules. Each policy rule in the current segmentation policy can be appended to the traffic policy.

At operation 906, the network controller can include the group membership of each user group referenced in the current segmentation policy. Recall that in accordance with the present disclosure the policy rules are expressed in terms of groups of users, rather than the individual members (i.e., network addresses) in that group; this allows the users in the group to change without having to revise the policy rules each time a user is added or deleted from the group. At operation 906, each of the policy rules in the current segmentation policy, identified above in operation 904, can be inspected to identify the user groups (source and destination) referenced by that policy rule. In some embodiments, for example, the entry 302 in group membership data store 208 shown in FIG. 3 for each identified user group can be appended to the traffic policy.

At decision point 908, the network controller can continue scanning the policy/domain assignments data store 206 in FIG. 6 to find the next segmentation policy associated with the current domain. If there is another segmentation policy associated with the current domain, for example if the network devices in the current domain operate with multiple VRFs, then the network controller can update the current segmentation policy to point (or refer) to the next segmentation policy to be processed. Processing can loop back to operation 902.

On the other hand, if there are no more segmentation policies associated with the current domain, then processing can be deemed to be complete. At this point, the computed traffic policy comprises the segmentation policies associated with the current domain, namely its policy rules, and the group membership of the user groups referenced by those policy rules. Processing can continue to operation 806 in FIG. 8.

Processing in the Network Devices

Details of the processing of traffic policies in the network devices are beyond the scope of the present disclosure. Briefly, however, when a network device receives a traffic policy, the network device can generate appropriate forwarding rules from the segmentation policy rules contained in the received traffic policy. Generating forwarding rules from a given segmentation policy rule includes expanding and replacing references to user groups expressed in the segmentation policy rule with corresponding network addresses of the members in those user groups using, for example, the group membership information contained in the received traffic policy. The generated forwarding rules can then be further processed by the network device, including combining the generated forwarding rules with already existing forwarding rules, programming the generated forwarding rules into the hardware tables, etc., the specific processing of which, as noted above, is beyond the scope of the present disclosure.

CONCLUSION

The present disclosure provides a solution to the challenge of generating, managing, and dynamically updating the network segmentation configuration between users over multiple independent domains. Embodiments in accordance with the present disclosure, allow users (e.g., network administrators) to configure network segmentation policy rules to control network traffic between users in order to increase security in the network.

Embodiments in accordance with the present disclosure allow users to integrate various sources of network membership classification (classification sources) that classify endpoints that access the network into different groups. These groups can be used to define segmentation (relationship) policy rules across user groups with the intent of allowing or disallowing traffic among user groups.

Embodiments in accordance with the present disclosure allow users to specify Segmentation rules based on user groups rather than the individual users in a group. Expressing segmentation rules in terms of user groups allows the classification sources to update (add, remove) members in a user group without the user having to make corresponding updates to the segmentation rules that reference those user groups, allowing for dynamic group updates.

Embodiments in accordance with the present disclosure enable defining and distributing segmentation policies on a per domain basis. In this way, the traffic policy generated for a given segmentation policy can be streamed only to the network devices in the domains associated with that segmentation policy. Incorporating the group membership into the traffic policy at the time it is generated allows for the traffic policy to contain the most up to date membership of the user groups specified in the given segmentation policy. Likewise, when rules in a segmentation policy are updated, it may be possible to stream the traffic policy as a minimal set of forwarding rules corresponding only to the updated segmentation rules.

The above description illustrates various embodiments of the present disclosure along with examples of how aspects of the present disclosure may be implemented. The above examples and embodiments should not be deemed to be the only embodiments, and are presented to illustrate the flexibility and advantages of the present disclosure as defined by the following claims. Based on the above disclosure and the following claims, other arrangements, embodiments, implementations and equivalents may be employed without departing from the scope of the disclosure as defined by the claims.

The invention claimed is:

1. A method in a network controller for managing a network, the method comprising:

receiving a plurality of user groups, each user group associated with a membership list that identifies members in the user group;

receiving a plurality of domains in the network, wherein each domain comprises a subset of network devices in the network;

receiving a plurality of segmentation policies, each segmentation policy comprising segmentation policy rules relating to communications between the user groups, wherein the segmentation policy rules specify user groups and actions between user groups;

associating the segmentation policies to corresponding domains in the plurality of domains;

receiving, from external sources separate from the network controller, group membership messages, each group membership message associated with a user group and comprising membership information about the user group;

updating the membership lists in the plurality of user groups using the membership information contained in the received group membership messages, including adding members and removing members; and streaming traffic policies to corresponding domains in the plurality of domains, wherein a traffic policy for a corresponding domain comprises (1) segmentation policy rules only of segmentation policies associated with the corresponding domain and (2) memberships of user groups specified in those segmentation policy rules, wherein the traffic policy is streamed only to network devices in the corresponding domain.

2. The method of claim 1, wherein the memberships of the plurality of user groups are updated by the group membership messages from the external sources on a repeated basis.

3. The method of claim 1, wherein updates to the memberships in the plurality of user groups do not affect the segmentation policy rules in the plurality of segmentation policies.

4. The method of claim 1, wherein the memberships in the plurality of user groups comprise Internet Protocol (IP) addresses or IP prefixes of the members of the user groups.

5. The method of claim 1, wherein the traffic policy is streamed to the corresponding domain in response to receiving a group membership message from one of the external sources.

6. The method of claim 1, wherein the segmentation policy rules specify actions to be performed on traffic flows between user groups.

7. The method of claim 1, wherein each domain comprises a non-overlapping set of network devices of the network.

8. The method of claim 1, further comprising receiving input to define the plurality of domains and the plurality of segmentation policies, and to associate the segmentation policies to corresponding domains.

9. A network controller for managing a network, the network controller comprising:

one or more data stores;

one or more computer processors; and a computer-readable storage device comprising instructions for controlling the one or more computer processors to:

store a plurality of user groups, each user group associated with a list of members in the user group;

store a plurality of segmentation policies, each segmentation policy comprising segmentation policy rules that specify user groups and actions between user groups;

update the list of members in the plurality of user groups using membership update information contained in messages received from external sources separate from the network controller;

generate a traffic policy for a first domain among a plurality of domains in the network, wherein the traffic policy comprises (1) segmentation policy rules only of segmentation policies associated with the first domain and (2) lists of members in the user groups specified in those segmentation policy rules; and stream the traffic policy only to network devices in the first domain.

10. The network controller of claim 9, wherein the external sources send messages to the network controller on a repeated basis.

11. The network controller of claim 9, wherein the segmentation policy rules in the plurality of segmentation policies do not need to be updated when the lists of members of the plurality of user groups are updated.

12. The network controller of claim 9, wherein updating the lists of members of the plurality of user groups include adding members and removing members.

13. The network controller of claim 9, wherein the lists of members of the plurality of user groups are identified by Internet Protocol (IP) addresses or IP prefixes.

14. The network controller of claim 9, wherein each domain comprises a non-overlapping set of network devices of the network.

15. A non-transitory computer-readable storage device in a network controller, the non-transitory computer-readable storage device having stored thereon computer executable instructions, which when executed, cause the network controller to:

receive a plurality of user groups, each user group associated with a list of members in the user group;

receive a plurality of segmentation policies, each segmentation policy comprising segmentation policy rules that specify user groups and actions between user groups;

update the list of members in the plurality of user groups using membership update information contained in messages received from external sources separate from the network controller;

generate a traffic policy for a first domain among a plurality of domains in the network, wherein the traffic policy comprises (1) segmentation policy rules only of segmentation policies associated with the first domain and (2) lists of members in the user groups specified in those segmentation policy rules; and stream the traffic policy only to network devices in the first domain.

16. The non-transitory computer-readable storage device of claim 15, wherein the lists of members in the plurality of user groups are repeatedly updated by the messages from the external sources.

17. The non-transitory computer-readable storage device of claim 15, wherein the segmentation policy rules in the plurality of segmentation policies do not need to be updated when the lists of members of the plurality of user groups are updated.

18. The non-transitory computer-readable storage device of claim 15, wherein updates to the lists of members of the plurality of user groups include adding members and removing members.

19. The non-transitory computer-readable storage device of claim 15, wherein the lists of members of the plurality of user groups are identified by Internet Protocol (IP) addresses or IP prefixes.

20. The non-transitory computer-readable storage device of claim 15, wherein each domain comprises a non-overlapping set of network devices of the network.

\* \* \* \* \*